US009421697B2

(12) United States Patent
Deardurff et al.

(10) Patent No.: US 9,421,697 B2
(45) Date of Patent: Aug. 23, 2016

(54) METHOD OF USING RECYCLED PET FLAKE DIRECTLY IN AN INJECTION MOLDING PROCESS

(71) Applicant: Phoenix Technologies International, LLC, Bowling Green, OH (US)

(72) Inventors: Lawrence Robert Deardurff, Waterville, OH (US); Henry A. Schworm, Findlay, OH (US)

(73) Assignee: Phoenix Technologies International, LLC, Bowling Green, OH (US)

( * ) Notice: Subject to any disclaimer, the term of this patent is extended or adjusted under 35 U.S.C. 154(b) by 0 days.

(21) Appl. No.: 14/640,505

(22) Filed: Mar. 6, 2015

(65) Prior Publication Data

US 2015/0251343 A1 Sep. 10, 2015

Related U.S. Application Data

(60) Provisional application No. 61/949,284, filed on Mar. 7, 2014.

(51) Int. Cl.

| | |
|---|---|
| ***B29C 45/00*** | (2006.01) |
| ***B29B 17/02*** | (2006.01) |
| *B29K 67/00* | (2006.01) |
| *B29C 45/17* | (2006.01) |

(52) U.S. Cl.

CPC ........... *B29B 17/02* (2013.01); *B29C 45/0001* (2013.01); *B29B 2017/0268* (2013.01); *B29C 45/17* (2013.01); *B29K 2067/003* (2013.01); *Y02W 30/622* (2015.05)

(58) Field of Classification Search

CPC ............................................. B29B 2017/0268

See application file for complete search history.

(56) References Cited

U.S. PATENT DOCUMENTS

| | | | | |
|---|---|---|---|---|
| 8,501,059 B2 | | 8/2013 | Schultz | |
| 2002/0033550 A1* | | 3/2002 | Suehara | B29C 45/0001 264/140 |
| 2003/0199596 A1* | | 10/2003 | Koike | B29B 17/00 521/40 |
| 2010/0117267 A1* | | 5/2010 | Schworm | B29B 9/08 264/344 |

OTHER PUBLICATIONS

Technology Brief: Using Recycled Plastics in an Injection Molding Process, Plastics Recycling Technical Assitance Report, Mar. 1999, two pages.*

Khait, Klementina et al., Solid-State Shear Pulverization of Plastics: A Green Recycling Process, Polym.-Plast. Techno. Eng., 38(3), 1999, pp. 445-457.*

Schut, Jan H., "Garbage In, Good Plastics Out", Plastics Technology, Jan. 2004, pp. 1-4.*

* cited by examiner

*Primary Examiner* — Jill Heitbrink

(74) *Attorney, Agent, or Firm* — Fraser Clemens Martin & Miller LLC; Michael E. Dockins

(57) ABSTRACT

A method of processing PCR plastic is disclosed, the method including a step of providing a bulk quantity of flakes of PCR plastic having a particle size of about 10 mm or larger separating ferrous and non-ferrous metals from the bulk of flakes of PCR plastic, comminuting the flake to a particle size less than 10 mm, such as about 4 mm, and thermally treating the flake to reduce a moisture content therein. The process may further including mixing the thermally treated flake with virgin plastic pellet and processing the mixture directly in an injection molding device.

20 Claims, 2 Drawing Sheets

METHOD OF USING RECYCLED PET FLAKE DIRECTLY IN AN INJECTION MOLDING PROCESS

CROSS-REFERENCE TO RELATED APPLICATION

This application claims the benefit of priority of U.S. Provisional Patent Application Ser. No. 61/949,284 filed on Mar. 7, 2014 hereby incorporated herein by reference in its entirety.

FIELD OF THE INVENTION

The present invention relates to polymers, and more particularly to methods involving the use and processing of recycled polymers.

BACKGROUND OF THE INVENTION

In the past, it has been difficult to use post-consumer recycled (PCR) polymeric flake directly in an injection molding process. High contaminant levels, both polymeric contaminants and contaminants that do not melt, present in the flake and the other attributes associated with post-consumer recycled polymeric flake associated with bulk density of the flake and moisture have made direct use of PCR polymeric flake in injection molding processes problematic. In order to use PCR polymeric flake material in large quantities (i.e., at high percentages as compared to virgin pellet) in an injection molding process, a dedicated and expensive melt filter system was required to remediate contamination concerns in the PCR flake. In order to address the bulk density and moisture attributes, specialized twin screw extrusion systems, often with vacuum venting systems, may be used in the injection molding process.

It would be desirable to develop a more efficient and cost-effective procedure of processing PCR flake for use directly in injection molding processes.

SUMMARY OF THE INVENTION

Concordant and congruous with the present invention, a more efficient and cost-effective procedure of processing PCR flake for use directly in injection molding processes has surprisingly been discovered.

The concept for the invention is to use a unique combination of processes that are not currently commercially utilized to yield a PCR polymeric flake that can be used directly in injection molding systems. The invention results in the use of high percentages of recycled flake directly into the injection molding system and to eliminate the pelletizing step commonly used to manufacture recycle pellet for the injection market. The elimination of the pelletizing step reduces the cost of conversion of the flake, improves the color of the final article (e.g., a preform), reduces yield loss in the entire value chain, reduces drying time with respect to the flake, and increases the IV of the final article.

In an embodiment of the invention, a method of processing PCR plastic comprises the steps of providing a bulk quantity of flakes of PCR plastic having a particle size of about 10 mm or larger; separating ferrous and non-ferrous metals from the bulk of flakes of PCR plastic; comminuting the flake to a particle size less than 10 mm; and thermally treating the flake to reduce a moisture content therein.

In another embodiment of the invention, a method of processing PCR plastic comprises the steps of providing a bulk quantity of flakes of PCR plastic having a particle size of 10 mm or larger; separating ferrous and non-ferrous metals from the bulk of flakes of PCR plastic; comminuting the flake to a particle size of about 4 mm; thermally treating the flake to reduce a moisture content therein; mixing a desired amount of the flakes of PCR plastic with virgin plastic pellets; and processing the mixture of flakes of PCR plastic and virgin plastic pellets in an injection molding system.

In another embodiment of the invention, a method of processing PCR plastic comprises the steps of providing a bulk quantity of flakes of PCR PET having a particle size of 10 mm or larger; separating ferrous and non-ferrous metals from the bulk of flakes of PCR PET plastic; comminuting the flake to a particle size of about 4 mm; thermally treating the flake to reduce a moisture content therein; mixing a desired amount of the flakes of PCR PET plastic with virgin plastic pellets; and processing the mixture of flakes of PCR PET plastic and virgin plastic pellets in an injection molding system having an inline filtration device, the inline filtration device for removing any non-melting contaminants.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DETAILED DESCRIPTION OF EXEMPLARY EMBODIMENTS OF THE INVENTION

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
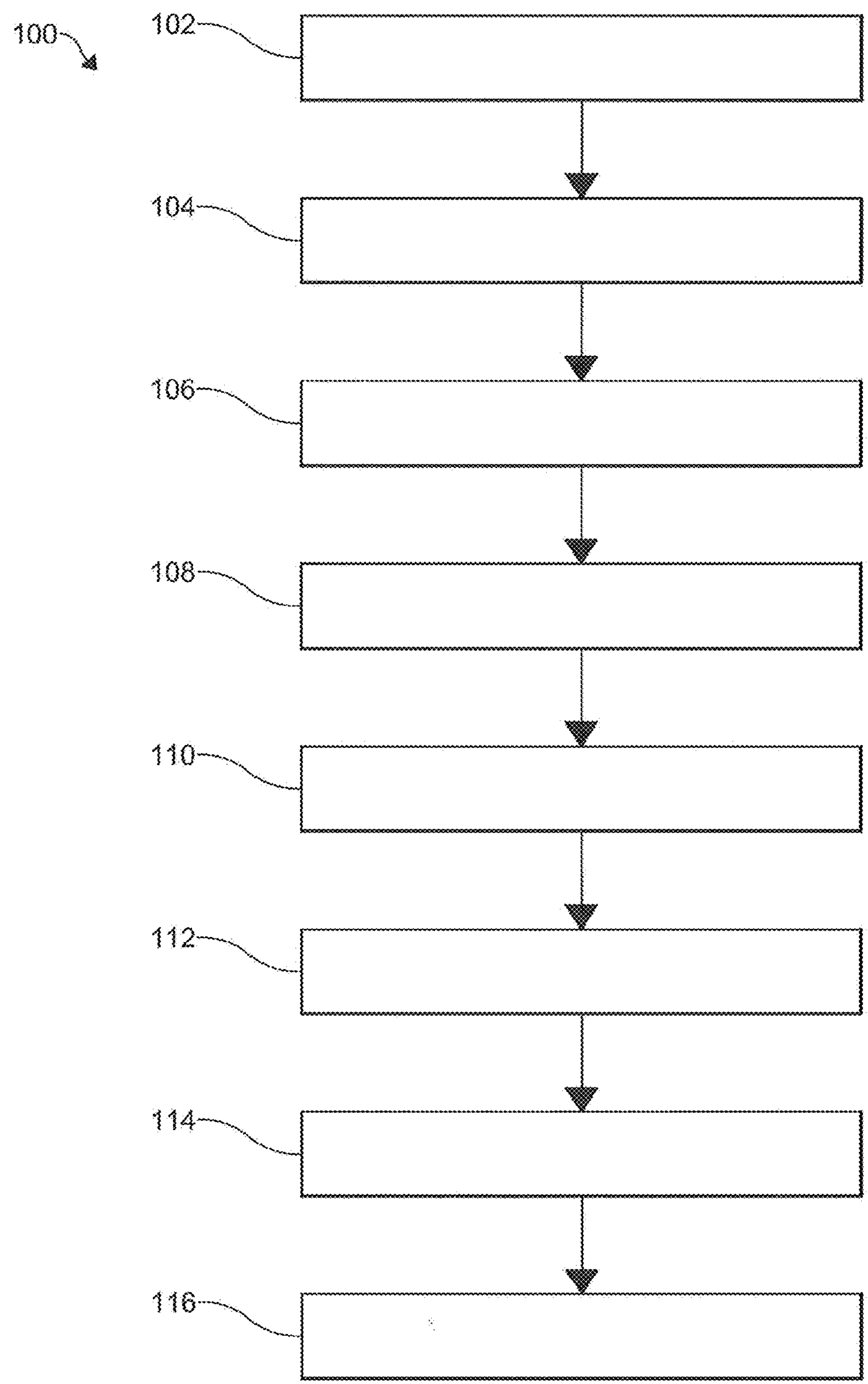
FIG. 1 is a flow diagram of the process of using recycled PET flake directly in an injection molding process according to an embodiment of the invention.

FIG. 1 shows a flow diagram of a process 100 according to an embodiment of the invention. The process 100 is a method of processing post-consumer recycled PCR) plastics for use directly in an injection molding machine. In a first step 102, a quantity of PCR plastic is provided. The PCR plastic may be provided in bulk and un-shredded form, for example, in bottle form. The bulk PCR plastic is then sorted by color, and by the plastic used to form the container (e.g., PET, PE, HDPE, PP, another polyolefin, and the like) and washed in a step 104.

In another step 106 the washed PCR plastic is comminuted and ground into flake having a particle size of 10 mm. With respect to RPET, the PCR plastic is subjected to a grinding operation in order to make the material easier to handle and process. Conventional grinding equipment reduces the RPET to about 10 mm particles or flakes. The grinding is conducted in a manner to insure that a consistent flake size will be produced, by employing a grate or screen through which the ground material must pass upon exiting the grinder. The bulk density of 10 mm flake RPET generally ranges from about 16 to about 22 pounds per cubic foot. By the term "flakes" as it is used herein is meant generally the commercially available recycled plastic materials, such as recycled polyethylene terephthalate, produced by conventional recycling methods, usually in flake form, but which may additionally be in the form of chunks, spheres, pellets, and the like, and which are generally made available in bulk in a substantially uniform particle size of about 10 mm±3 mm.

In is understood that commercially available bulk recycled flake may be acquired rather than acquiring recycled containers and articles that require comminuting and washing per the steps 102, 104, 106. In another step 108, a separation step is conducted to remove ferrous and non-ferrous metals from the flake, thereby removing a majority of non-melting contaminants from the flake. By removing metallic contaminants from the flake prior to introduction of the flake into an injection molding system, a reduction in the filtration requirements on the injection molding system is achieved. When metallic materials are not removed from the flake, a continuous flushing melt filtration system is required. By removing the metallic contaminants prior to the introduction of the flake into the injection molding system, a simple replaceable filter element can be used. The use of the replaceable element also improves the yield in the operation by eliminating the material losses associated with the back flush operation associated with a continuous flushing melt filtration system. It is understood that the metallic contaminants may be removed using known electrostatic techniques, electromagnets, eddy current separators, and the like.

In a step 110, the flake is further comminuted from the standard 10 mm particle to a particle size less than 10 mm. For example, the flakes may be comminuted to a size between about 1 mm and about 9 mm, from a size of about 2 mm to about 8 mm, from a size from about 3 mm to about 6 mm, from a size from about 4 mm to about 6 mm, to a size of about 4-5 mm, or to a size of about 4 mm to assist in subsequent crystallization and drying of the flake. For a particle size of about 4 mm, the step 110 also increases the bulk density of the recycled flake is from about 32 to about 36 pounds per cubic foot. By increasing the bulk density of the recycled flake and mixing the same with virgin pellet as it enters the injection molding screw, the need is removed for twin screw extrusion technology to handle the infeed of recycled flake.

In a step 112 the recycled flake is thermally treated. The step 112 may be a thermal treatment to crystallize and/or to dry the flake prior to shipment of the recycled flake to and end user of the flake (also referred to as a converter). The drying and/or crystallization may be achieved by conventional means such as, for example, heating the mass of RPET particles/flakes to a temperature below the melt temperature of the plastic. This heating may be accomplished, for example, by passing a gas over or through the bed of flake. Examples of useful gases include, but are not limited to, air, nitrogen, argon, and the like, as well as mixtures thereof. Alternatively, the flake may be dried and/or crystallized in heated chambers for required periods of time up to about five hours. It is understood that the sequence of the steps 108, 110, 112 may vary (e.g., 112-110-108, 108-112-110, 110-112-108, 110-108-112, 112-108-110) and still provide acceptable product.

In the case of RPET, RPET flake typically has a moisture content of about 1% or less (in terms of mass absorbed in the resin on a % w/w basis) which is nearly eight times (8×) the moisture content of virgin PET (about 0.13% or less). This high moisture loading may overload the capacity of drying equipment sized for processing virgin resin. By performing the thermal treatment step 112, the moisture level in the recycled plastic flake processed through the step 112 may be reduced to about the same level as found in virgin pellet and would thus be suitable for processing in the installed production equipment with no further modifications, adjustments, or atypical equipment required. In addition to reducing the moisture content, the crystallization/drying step 112 has a further benefit of militating against an agglomeration of the flake as it goes through the high temperature drying process.

In a step 114, a bulk of flake is introduced into an injection molding system for processing. The bulk of resin may be 100% flake formed from the recycled plastic processed per the steps 102-112, or a mixture of a desired amount of the recycled flake with virgin pellet with any ratio between 0% and 100% of PCR flake. For example, the mixture may be between about 10% and about 90% of the recycled flake, between about 10% and about 75% of the recycled flake, between about 10% and about 55% of the recycled flake, between about 10% and about 45% of the recycled flake, between about 10% and about 35% of the recycled flake, between about 10% and about 25% of the recycled flake, between about 15% and about 90% of the recycled flake, between about 20% and about 90% of the recycled flake, between about 30% and about 90% of the recycled flake, between about 20% and about 100% of the recycled flake, between about 50% and about 100% of the recycled flake, between about 90% and about 100% of the recycled flake, and the like.

Below is a table of data showing the bulk density of various mixtures of recycled flake and virgin pellet, the virgin pellet having a bulk density of about 52 lb/ft$^3$. The table further includes a comparison of bulk flake formed from recycled plastic according to the process described hereinabove in steps 102-112 (e.g., particle sizes about 4 mm) as compared to other recycled flake that is commercially available and typically used, e.g., 16 lb/ft$^3$ flake and 23 lb/ft$^3$ flake, mixed with the same virgin pellet:

| % recycled flake with virgin pellet | 16 lb/ft$^3$ flake | 23 lb/ft$^3$ flake | 4 mm flake |
|---|---|---|---|
| | bulk density of blend | | |
| 0% (100% virgin pellet) | | | |
| About 11% | 45 | 47 | 49 |
| About 17% | | 44 | |
| About 23% | 38 | 41 | 46 |
| About 29% | | 39 | |
| About 33% | 32 | 38 | 44 |
| About 45% | 29 | 35 | 42 |
| About 55% | 26 | 32 | 40 |
| About 65% | 23 | 29 | 38 |
| About 75% | 20 | 26 | 36 |
| 100% (PCR flake only) | 16 | 23 | 34 |

In a step 116, the bulk flake from step 114 having a desired content of recycled flake is processed in the injection molding system and through an inline filtration system in the injection molding system. The bulk flake is fed into the system through a drying hopper which in turn feeds an inlet end of a plasticizing screw. The plasticizing extruding screw is encapsulated in a barrel which is heated by barrel heaters (i.e., the extruder). Helical (or other) flights of the screw convey the raw material along an operational axis of the screw. Typically, a root diameter of the screw is progressively increased along the operational axis of the screw in a direction away from the inlet end. Once a desired amount of the melt is accumulated in the extruder, it is transferred into a melt accumulator, which is also sometimes referred in the industry as a “shooting pot”, the melt accumulator being equipped with an injection plunger, which performs the injection function of the melted plastic into a mold cavity.

A melt filter located in fluid communication with and between the extruder and the melt accumulator performs the inline filtration of step 116. The purpose of the melt filter is to filter impurities and other foreign matters from the plasticized material being transferred from the extruder to the melt accumulator. The specific implementation for the melt filter is not specifically limited and, as an example, an off-the-shelf filter from Gneuss Inc. of Matthews, N.C. (www.gneuss.com) can be used to implement the melt filter. A non-limiting example of an injection molding system that may be used in the inline filtration step 116 is disclosed in U.S. Pat. No. 8,501,059 to Husk, for example. The ’059 patent is hereby incorporated herein by reference in its entirety. The inline filtration system of the ’059 patent is generally meant to protect gates of the hot runner system from any tramp metal that may be present in the in-plant regrind or in virgin material. Inline filtration is not used for injection molding systems, such as a PET injection molding system. The inline filtration step 116 may be performed in a system having an inlet (not shown) for allowing an inflow of material to be filtered, and a filter outlet (not shown) to allow for an outflow of the filtered material. The melt filter includes a filtering member disposed between the filter inlet and filter outlet. The melt filter can also be associated with a drool outlet (not shown) for allowing material that is used for backflushing the melt filter to drool out. The filtering member may be implemented as a rotational filtering member with a backflush option. The step 116 is adapted to capture any low levels of non-meltinglic hard contaminant that may be present in the recycle flake after it has been pre-processed in steps 102-114, as disclosed above.

Figure 2:
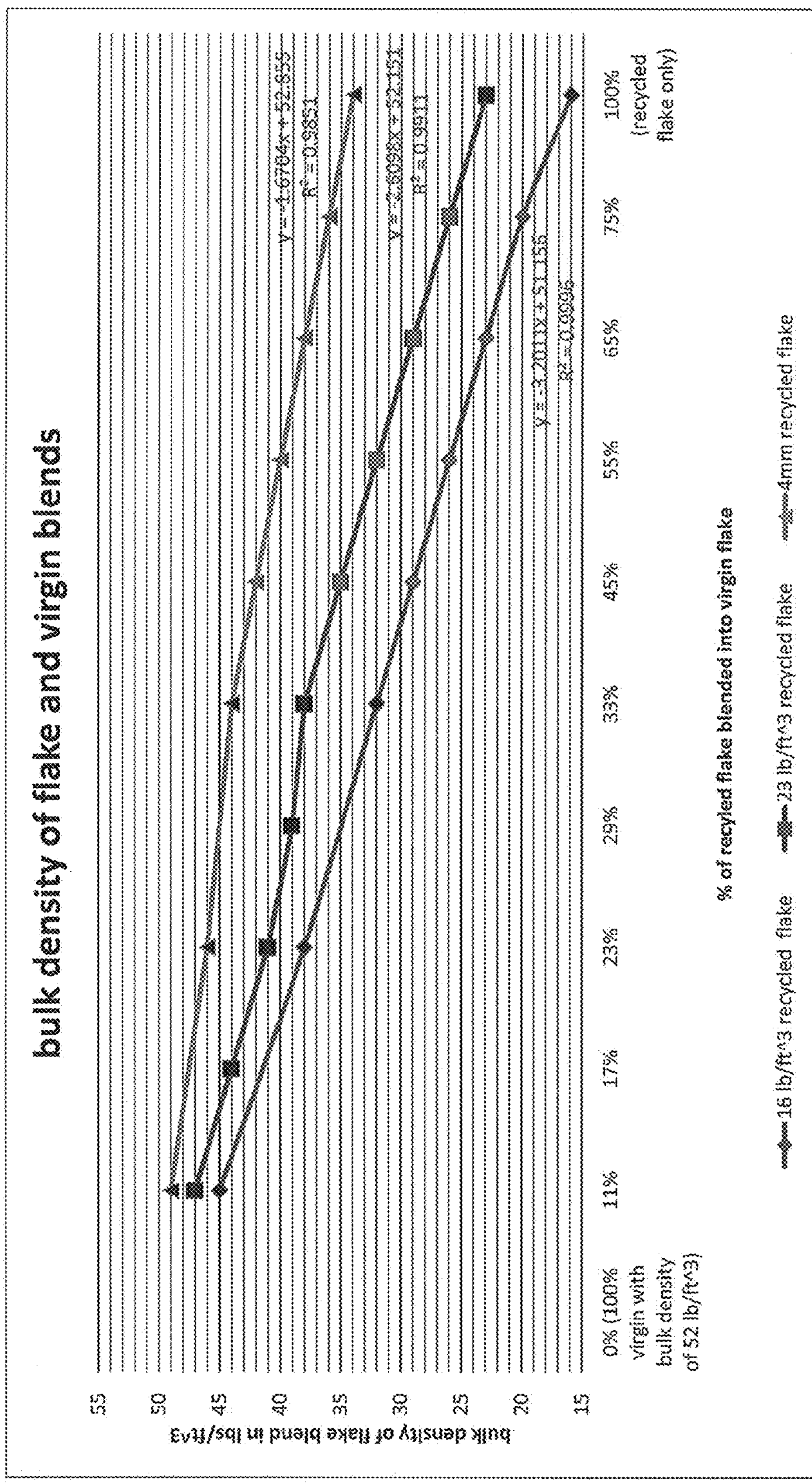
FIG. 2 is a graph showing a bulk density of recycled flake according to the present invention mixed with virgin pellet in varying percentages as compared to a bulk density of commercially available recycled flake mixed with the same virgin pellet.

By performing the process disclosed herein in steps 102-114, as best shown by FIG. 2, PCR plastic may be used directly in the injection molding system for injection molding an article, such as a preform. By utilizing the methods disclosed herein, use of a high percentage of recycled flake directly into the injection molding system may be used and the pelletizing step commonly used to manufacture recycle pellet for the injection market may be eliminated. The elimination of the pelletizing step reduces the cost of conversion of the flake, improves the color of the final article (e.g., a preform), reduces yield loss in the entire value chain, reduces drying time with respect to the flake, and increases the IV of the final article.

Further areas of applicability will become apparent from the description provided herein. It should be understood that the description and specific examples are intended for purposes of illustration only and are not intended to limit the scope of the present disclosure.

While certain representative embodiments and details have been shown for purposes of illustrating the invention, it will be apparent to those skilled in the art that various changes may be made without departing from the scope of the disclosure, which is further described in the following appended claims.

From the foregoing description, one ordinarily skilled in the art can easily ascertain the essential characteristics of this invention and, without departing from the spirit and scope thereof, can make various changes and modifications to the invention to adapt it to various usages and conditions.

We claim:

1. A method of processing PCR plastic comprising the steps of:

providing flakes of PCR plastic having a particle size of about 10 mm or larger;

separating ferrous and non-ferrous metals from the flakes of PCR plastic;

comminuting the flakes of PCR plastic to a particle size of about 4 mm;

thermally treating the flakes of PCR plastic to reduce a moisture content therein; and mixing an amount of the flakes of PCR plastic with virgin plastic pellets to provide a mixture having a density of at least about 36 pounds per cubic foot;

processing the mixture of flakes of PCR plastic and virgin plastic pellets in an injection molding system.

2. The method of claim 1, wherein the injection molding system includes an inline filtration device for removing any non-melting contaminants from the flakes of PCR plastic.

3. The method of claim 1, wherein the amount of the flakes of PCR plastic is between about 10% and about 90%.

4. The method of claim 3, wherein the amount of the flakes of PCR plastic is between about 10% and about 75%.

5. The method of claim 4, wherein the amount of the flakes of PCR plastic is between about 10% and about 55%.

6. The method of claim 5, wherein the amount of the flakes of PCR plastic is between about 10% and about 45%.

7. The method of claim 6, wherein the amount of the flakes of PCR plastic is between about 10% and about 35%.

8. The method of claim 7, wherein the amount of the flakes of PCR plastic is between about 90% and about 100%.

9. The method of claim 1, wherein the flakes of PCR plastic are formed from PET.

10. The method of claim 1, wherein separating step is performed using one of electrostatic techniques, an eddy current separator, and an electromagnet.

11. The method of claim 1, wherein the thermal treatment step involves heating the flakes of PCR plastic to a temperature below the melting temperature of the plastic forming the flakes of PCR plastic.

12. The method of claim 11, wherein the thermal treatment step is performed by passing a gas over or through a bed of the flakes of PCR plastic.

13. The method of claim 11, wherein the thermal treatment step is performed in a heated chamber.

14. The method of claim 11, wherein the thermal treatment step results in the flakes of PCR plastic having a moisture content of about 1% or less.

15. The method of claim 14, wherein the thermal treatment step results in the flakes of PCR plastic having a moisture content of about 0.13% or less.

16. A method of processing PCR plastic comprising the steps of:

providing flakes of PCR plastic having a particle size of 10 mm or larger;

separating ferrous and non-ferrous metals from the flakes of PCR plastic;

comminuting the flakes of PCR plastic to a particle size of about 4 mm;

thermally treating the flakes of PCR plastic to reduce a moisture content therein to a moisture content of about 1% or less;

mixing a desired amount of the flakes of PCR plastic with virgin plastic pellets;

mixing an amount of the flakes of PCR plastic with virgin plastic pellets to provide a mixture having a density of at least about 36 pounds per cubic foot; and processing the mixture of flakes of PCR plastic and virgin plastic pellets in an injection molding system.

17. The method of claim 16, wherein the injection molding system includes an inline filtration device for removing any non-melting contaminants.

18. The method of claim 17, wherein the thermal treatment step results in the flakes of PCR plastic having a moisture content of about 0.13% or less.

19. A method of processing PCR plastic comprising the steps of:

providing flakes of PCR PET having a particle size of 10 mm or larger;

separating ferrous and non-ferrous metals from the flakes of PCR PET plastic;

comminuting the flakes of PCR plastic to a particle size of about 4 mm;

thermally treating the flakes of PCR plastic to reduce a moisture content therein;

mixing amount of the flakes of PCR PET plastic with virgin plastic pellets to provide a mixture having a density of at least about 36 pounds per cubic foot; and processing the mixture of resin of PCR PET plastic flakes and virgin plastic pellets in an injection molding system having an inline filtration device, the inline filtration device removing any non-melting contaminants.

20. The method of claim 19, wherein the thermal treatment step results in the flakes of PCR plastic having a moisture content of about 1% or less.

* * * * *